United States Patent
Hussey et al.

(10) Patent No.: US 8,349,030 B1
(45) Date of Patent: Jan. 8, 2013

(54) METHOD FOR MAKING ANODES FOR HIGH VOLTAGE ELECTROLYTIC CAPACITORS WITH HIGH VOLUMETRIC EFFICIENCY AND STABLE D.C. LEAKAGE

(75) Inventors: Steven C. Hussey, Simpsonville, SC (US); Yuri Freeman, Greer, SC (US); Philip M. Lessner, Newberry, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 13/238,495

(22) Filed: Sep. 21, 2011

(51) Int. Cl.
*H01G 9/00* (2006.01)

(52) U.S. Cl. ...................................... 29/25.03

(58) Field of Classification Search ............... None
See application file for complete search history.

(56) References Cited

U.S. PATENT DOCUMENTS

| | | |
|---|---|---|
| 5,825,611 A | 10/1998 | Pozdeev |
| 6,410,083 B1 | 6/2002 | Pozdeev-Freeman |
| 6,447,570 B1 | 9/2002 | Pozdeev-Freeman |
| 6,554,884 B1 | 4/2003 | Tripp et al. |
| 7,731,893 B2 | 6/2010 | Freeman et al. |

*Primary Examiner* — Seahvosh Nikmanesh
(74) *Attorney, Agent, or Firm* — Joseph T. Guy; Nexsen Pruet, LLC

(57) ABSTRACT

A process for the manufacturing valve metal anodes is provided. The process includes:
providing a valve metal powder;
pressing the valve metal powder to form a pellet;
first deoxidizing the pellet with a first reducing agent to form a first oxide of reducing agent on the pellet;
removing the first oxide of reducing agent from the pellet to form a deoxidized pellet;
sintering the deoxidized pellet to form a sintered pellet;
second deoxidizing the sintered pellet with a second reducing agent to form a second oxide of reducing agent on the sintered pellet; and
removing said second oxide of reducing agent.

18 Claims, 2 Drawing Sheets

METHOD FOR MAKING ANODES FOR HIGH VOLTAGE ELECTROLYTIC CAPACITORS WITH HIGH VOLUMETRIC EFFICIENCY AND STABLE D.C. LEAKAGE

BACKGROUND

The invention is related to a method for the formation of refractory valve metal-based anodes with improved volumetric efficiency and D.C. leakage stability. The anodes are particularly suitable for use in high voltage electrolytic capacitors. More specifically, the present invention is related to an improved method of deoxidizing valve metal, particularly niobium and tantalum, anodes and improved capacitors formed with the improved anode.

Manufacturing high voltage electrolytic capacitors requires the use of high formation voltages whereby thick dielectric films are grown. Thick dielectrics are required if the capacitor is to be capable of withstanding high application voltages without degradation and electrical breakdown. It is known, for both Ta and Nb capacitors that electric charge (CV) is not linear with voltage and decreases with increased formation voltage. Capacitance is defined by the $C=kA/t$ wherein $t=aV_f$. Since kA and a are constants for a given anode the equation $C=D/V_f$ is derived wherein D is a constant. Therefore one would expect CV to be flat with formation voltage. Therefore, to achieve high application voltages large anodes are required which limits volumetric efficiency for high capacitance capacitors.

While not limited to any theory, it is thought in the art that limited volumetric efficiency is caused by anodic oxide film growing through the necks formed between powder particles during pressing thereby clogging the pores in sintered anodes. The result is a reduction in surface area of the anodes which causes CV to be non linear in a phenomenon which is referred to in the art as rolling down. Increasing formation voltage in electrolytic capacitors is also believed to be limited by the precipitation of crystalline phases in the amorphous matrix of the anodic oxide dielectric film. The crystalline phases are thought to inhibit formation of a thick amorphous insulating film on the anode surface and they are also thought to provoke high and unstable D.C. leakage. Crystalline phases are typically associated with impurities such as transition metals, carbon and bulk oxygen. The major source of bulk oxygen is native oxide, which dissolves in the bulk of the particles during sintering of the anodes.

U.S. Pat. Nos. 5,825,611; 6,410,083 and 6,554,884 are representative of attempts to address the crystalline oxide problem wherein the Ta or Nb anodes are treated with nitrogen to reduce the affinity of Ta(Nb) for oxygen while limiting nitride precipitation.

U.S. Pat. No. 4,537,641 describes the reduction of bulk oxygen content in Ta(Nb) anodes by adding a reducing agent, such as Mg, to sintered anodes and heating the anodes above the melting point of the reducing agent but below the temperature conventionally used for sintering of valve-metal anodes. During the heating, vaporized reducing agent deposits on the anode surface and reacts with oxygen in Ta(Nb) thereby creating a cover oxide layer of MgO. The oxide coating is thought to avoid the immediate reoxidation of the anode in air. The source of Mg can be Mg powder or Mg chunks placed in the crucibles with the Ta(Nb) anodes. Typical temperature range for deoxidizing is 900° C.-1100° C., depending on powder CV. After the Ta(Nb) anodes are removed from the deoxidizing furnace, the cover oxide layer is chemically leached from the anode surface with material such as a diluted solution of sulfuric acid and hydrogen peroxide.

An alternative process, described in U.S. Pat. No. 6,447,570, is based on a deoxidizing and sintering combination. In this process, referred to in the art as Y-sintering, Ta(Nb) powder is first pressed into a pellet and Mg is added to the pellets. The pellets and Mg are placed in crucibles in a vacuum oven and heat treated under inert atmosphere to generate Mg vapor which forms MgO thereby deoxygenating the Ta(Nb). The sample is then sintered in vacuum, or inert gas, without the anode being exposed to air. When oxygen, which is sintering retardant, is removed from the Ta(Nb) by deoxidizing, the Ta(Nb) particles can be sintered at lower temperatures vs. the temperature conventionally used for sintering of valve-metal anodes. This process provides improved morphology of the sintered anodes with thicker necks between the powder particles and more open pores between the particles. The improvement is believed to be due to surface diffusion of the Ta atoms as an alternative to the bulk diffusion of Ta atoms which dominants at conventional sintering temperatures. During cooling, after sintering, the pellets are treated with nitrogen to reduce the Ta(Nb) affinity for oxygen. After exposure to air the anodes are leached to remove the MgO cover layer. Improved morphology and low oxygen in the Ta(Nb) anodes results in improved volumetric efficiency of the finished Ta(Nb) electrolytic capacitors.

The disadvantage of Y-sintering is that it can not be used for sintering of coarse Ta(Nb) powders such as those used to manufacture high voltage electrolytic capacitors. This is because coarse Ta(Nb) powders with large primary particles require higher sintering temperatures vs. temperatures required for sintering of the higher CV powders with small primary particles. At high sintering temperatures the MgO layer formed on the Ta surface during deoxidizing interacts with Ta(Nb) which contaminates the Ta(Nb) surface thereby inhibiting the formation of a thick insulating film on the anode surface and provoking high and unstable D.C. leakage. Another disadvantage of Y-sintering is that it can not be used efficiently due to the complexity and inefficiency of the equipment needed for its practical realization. During deoxidizing, Mg vapor spreads through the reaction chamber and condenses on all cold parts, including electrical insulation of the heaters. During consequent sintering in vacuum or in inert gas, Mg shunts can cause shortage of the power and control circuits. Long and difficult cleaning of residual Mg must be performed after each run of the furnace.

An alternative process that addresses some of these problems is described in U.S. Pat. No. 7,731,893. According to this process, Ta(Nb) anodes are deoxidized in a deoxidizing furnace using Mg vapor thereby creating a cover layer of MgO and cleaning Ta(Nb) bulk from oxygen. This cover layer prevents the formation of a native oxide on the Ta(Nb) surface when the deoxidized anodes are subsequently exposed to air. Immediately or at a later date, the MgO coated anodes are placed in a separate vacuum oven and sintered. The deoxidized anode, with a MgO coating, can be sintered at lower temperatures than the temperature conventionally used for sintering of valve-metal powder. Sintering at the lower temperature results in an improved morphology and lower oxygen content in the sintered anodes. After cool-down, the MgO cover is removed by a diluted water solution of sulfuric acid and hydrogen peroxide. This sintering process provides essentially the same increased volumetric efficiency as that obtained with Y-sintering; however, it doesn't require any special equipment and maintenance operations and, thereby, is highly productive.

The disadvantages of sintering with a MgO coating in place is the same as the disadvantages of Y-sintering. Neither process can be used for sintering of coarse Ta(Nb) powders because MgO layers formed on Ta(Nb) during deoxidizing interacts with Ta(Nb) at high sintering temperature thereby contaminating the Ta(Nb) surface, and inhibiting high voltage formation which provokes high and unstable D.C. leakage.

There has been an ongoing desire for a method of forming sintered tantalum and niobium anodes which have high volumetric efficiency yet which can be manufactured with minimal effort.

SUMMARY

It is an object of the invention to provide an improved anode for use in a capacitor.

A particular advantage is improved volumetric efficiency of the anode.

Yet another particular advantage is improved aging stability, particularly, with regards to D.C. Leakage.

These and other advantages, as will be realized, are provided in a process of manufacturing valve metal anodes. The process includes:
providing a valve metal powder;
pressing the valve metal powder to form a pellet;
first deoxidizing the pellet with a first reducing agent to form a first oxide of reducing agent on the pellet;
removing the first oxide of reducing agent from the pellet to form a deoxidized pellet;
sintering the deoxidized pellet to form a sintered pellet;
second deoxidizing the sintered pellet with a second reducing agent to form a second oxide of reducing agent on the sintered pellet; and
removing said second oxide of reducing agent.

DETAILED DESCRIPTION

The present invention is related to an improved method of forming valve metal, preferably tantalum or niobium, anodes using two deoxidizing processes. One deoxidation process is before sintering and a second deoxidation process is done after sintering with a cleaning, or leaching, step after each deoxidation. More specifically, the present invention is related to a method of forming valve metal, and preferably niobium or tantalum, anodes by deoxidizing thereby providing an increased volumetric efficiency and low, and stable, D.C. leakage in high voltage electrolytic capacitors.

Deoxidation is accomplished by the use of a reducing agent with a higher oxygen affinity than the valve metal. Preferred reducing agents include alkali metals, alkaline earth metals or aluminum. Calcium, magnesium and aluminum are preferred reducing agents with magnesium being most preferred.

The valve metal is preferably either niobium or tantalum due to the advantages provided by magnesium as a reducing agent. Other valve metals can be employed with a reducing agent that has a higher oxygen affinity than the valve metal and can be removed.

The invention will be described with reference to the figures forming an integral, non-limiting, part of the instant application. Throughout the specification similar elements will be numbered accordingly.

Figure 1:
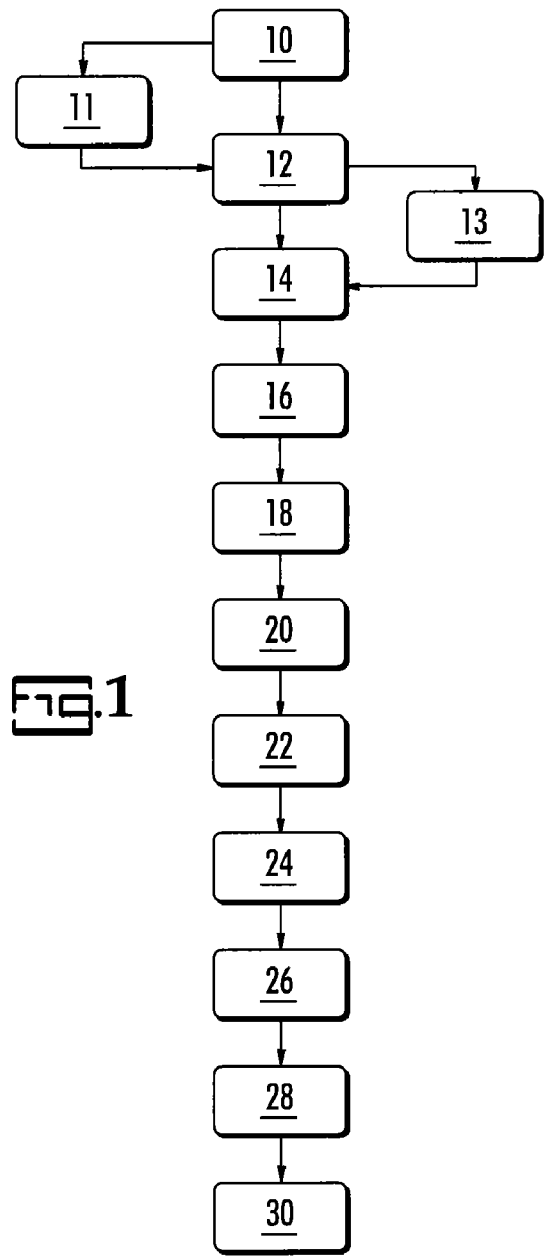
FIG. 1 is a flow chart representation of an embodiment of the invention.

An embodiment of the invention will be described with reference to FIG. 1. In FIG. 1, the process of forming an anode in accordance with the invention is illustrated in flow chart representation. In FIG. 1, a coarse valve metal powder is provided at 10 and pressed into pellets at 12. It is optional, but preferable, to add a lubricant or binder to the powder at 11. A lubricant or binder used during pressing improves the density uniformity through the pellet and prevents die wear-out. An anode lead wire can be embedded into the pellet during the pressing or welded to the pellet on later stage of the anode manufacturing. During pressing native oxide, which covers surface of Ta(Nb) particles, incorporates in the original necks which inhibit subsequent sintering processes.

If a lubricant or binder is used the lubricant or binder is removed at 13 by heating in vacuum, or by washing in aqueous detergents. The pressed anodes are deoxidized at 14 by reaction with a reducing agent in a deoxidizing furnace at temperatures above the melting point of the reducing agent and typically in the range of and more preferably 900° C. to 1100° C. These temperatures are much lower than conventional sintering temperatures of the coarse powders used for high voltage capacitors, which are typically in the range 1600° C.-2100° C. depending on the powder CV/g. This first deoxidizing process removes bulk oxygen from the powders preferably from the original necks between the powder particles created at the pressing process. In a particularly preferred embodiment the pressed pellets placed in crucibles with Mg chunks or powder and deoxidized by heating above the melting point of magnesium.

After the anodes are exposed to air, the layer of reducing agent oxide on the surface is removed, at 16, preferably by leaching. Leaching can be accomplished in an aqueous mineral acid. A particularly suitable wash solution for removing MgO is a dilute aqueous solution of sulfuric acid and hydrogen peroxide. Since the temperature of the deoxidizing process is much lower than the sintering temperature, there is no residual reducing agent contaminating surface after leaching. Deoxidized and leached anodes then undergo sintering, at 18, in vacuum in a sintering furnace at sintering temperatures equal or slightly lower than conventionally used sintering temperatures. Sintering temperatures are preferably about 1,200° C. to about 1,800° C. and typically about 1500° C. After sintering the anode is subjected to a second deoxidizing process, at 20, and is subjected to a leaching step, at 22, wherein the oxide of the reducing agent is removed. The second deoxidizing step and leaching step is preferably performed under the same conditions as the first deoxidizing and leaching for manufacturing convenience though different conditions can be used within the scope of conditions suitable for removing the oxide of the reducing agent from the surface.

It is preferable to incorporate the anode into a capacitor. Returning to FIG. 1, the anode is anodized at 24 to form a dielectric on the surface wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art.

A cathode layer is formed on the dielectric at 26. The cathode is a conductive layer and may be formed from conductive polymers, such as conductive thiophenes with polyethylenedioxythiophene being exemplary for use in the demonstration of the invention. Other cathode layers, such as manganese dioxide which is a conductive semiconductor, are suitable for use in demonstration of the invention.

It is widely understood that external terminations are difficult to form on the cathode, particularly with a conductive polymeric cathode, and additional layers are typically included at 28 to facilitate termination. In particular, carbon layers overcoated with metal layers, such as silver or nickel, are suitable for demonstration of the invention.

The capacitor is typically finished at 30. Finishing may include attachment of external terminations, encapsulating in an insulator, testing, packaging and the like.

Figure 2:
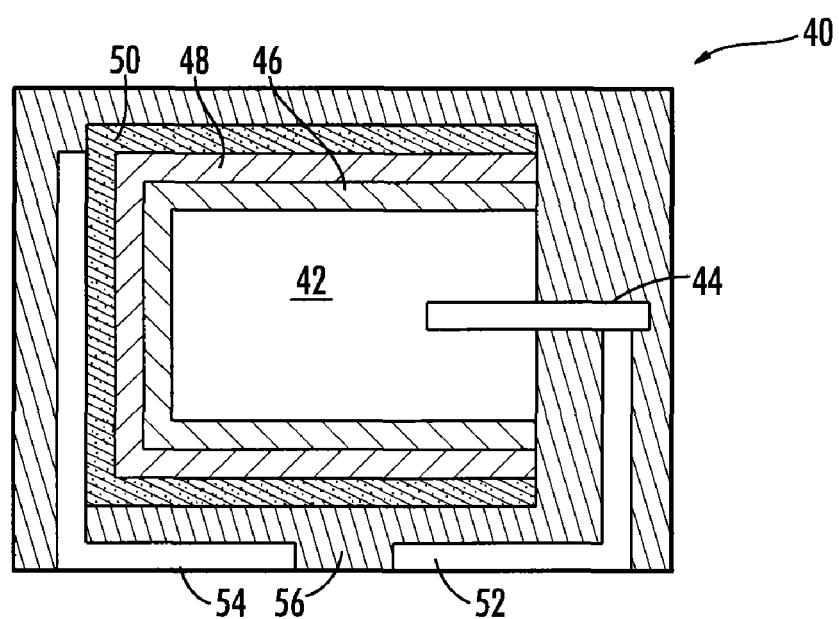
FIG. 2 is a cross-sectional schematic view of an embodiment of the invention.

A capacitor is illustrated schematically in cross-sectional view in FIG. 2. In FIG. 2, the capacitor, generally represented at 40, comprises an anode, 42, as described elsewhere herein. An anode lead wire, 44, extends from the anode and is either pressed in the anode or attached to the surface of the anode. A dielectric, 46, is on the surface of the anode. A cathode layer, 48, is on the surface of the dielectric and additional layer, or layers, 50, facilitate adhesion of a cathode external termination, 54. An anode external termination, 52, is in electrical connection with the anode lead wire. An encapsulant, 56, preferably encases all but a portion of the external terminations.

The use of two deoxidizing processes surprisingly provides improved morphology to the anodes as represented by thicker necks and more open pores. While not limited to theory, the surprising improvement is thought to be due to removal of oxygen from the original necks at the first deoxidizing which increases the contribution of surface diffusion of valve metal atoms during the sintering process. This improved morphology reduces CV/g rolling down at high formation voltages, thereby providing a higher volumetric efficiency in finished capacitors. The formation and removal of the layer of oxides of the reducing agent after the first deoxidizing and before high temperature sintering prevents interactions between the reducing agent or its oxide and the valve metal, which substantially eliminates the contaminating of the surface by reducing agent. The second step of deoxidizing and removing the oxide of the valve metal, after high temperature sintering, removes oxygen from the bulk of the particles which are caused by native oxide dissolving in the particles during sintering. High chemical purity of valve metal particles prevents the formation of crystalline inclusions in the amorphous matrix of the anodic oxide during the formation process provides a low and stable DCL for high voltage electrolytic capacitors made with these anodes. Using conventional deoxidizing and sintering furnaces with regular maintenance procedures provides high productivity to this sintering process.

Coarse powders have a preferred CV/g of at least 1,000 $\mu$C/g to no more than 50,000 $\mu$C/g. More preferably the course Ta(Nb) powders have a CV/g of at least 1,500 $\mu$C/g to no more than 15,000 $\mu$C/g. The density of coarse powders is preferably at least about 5 g/cc to no more than about 9 g/cc depending on the powder CV/g.

The crush strength of the pressed anodes is typically in the range 5 kg to 15 kg depending on the press density and anode size. This high crush strength indicates that original necks between the powder particles are created during the pressing process due to the partial penetration of the powder particles inside each other under high pressure.

A vacuum refers to a pressure which is lower than atmospheric pressure. In practice a pressure of no more than ($10^{-4}$ atm) is suitable for demonstration of the teachings herein. Inert gas refers to non-reactive gases or gases which exclude oxidizers such as oxygen. Particularly preferred inert gases include nitrogen, argon, helium and neon. Argon is most preferred. Nitrogen can form nitrides at high sintering temperatures, particularly with tantalum, and is therefore less preferred.

Inventive Example

Cylindrical Ta anodes with a diameter of 5.1 mm and a length of 10.7 mm were pressed green using a powder, with a capacitance of 12,000 $\mu$C/g, to a density of approximately 6 g/cc. The oxygen content in the powder and pressed pellets was determined to be approximately 1400 ppm as measured by a LECO TC600 oxygen analyzer. The pressed pellets were placed in a crucible, Mg chunks were added to the crucibles, and the crucible was placed in deoxidizing furnace. The deoxidizing was performed at approximately 1000° C. for 3 hours. After cooling the deoxidized anodes were removed from the deoxidizing furnace and the MgO was removed by leaching in a dilute aqueous solution of sulfuric acid and hydrogen peroxide such as about 1-15% sulfuric acid and about 5-30% hydrogen peroxide. After removal of the MgO the anodes were sintered in vacuum at a temperature of 1600° C. for 15 min., allowed to cool to room temperature and removed from the sintered furnace. A second deoxidizing and second leaching were performed at the same conditions as the first deoxidizing and first leaching. A dielectric layer of tantalum oxide was formed on that Ta anodes using standard techniques at a formation voltage of 190 V in a dilute aqueous solution of phosphoric acid. A conductive polymeric cathode of poly (3,4-ethylendioxythiophene) PEDOT was deposited on the dielectric surface by several cycles of dipping the formed anodes in an aqueous dispersion of PEDOT particles and drying in air at 85° C. Conductive layers of carbon and silver were deposited on the PEDOT surface using standard techniques following by encapsulating of the capacitors in metal cans. Electrical measurements were performed at ambient temperature at the rated voltage of 60 V on as-manufactured capacitors and again after a 2000 hour Life test at rated voltage and 85° C. The Life test is done for 2000 hours at the rated voltage of 60 V at 85° C. The average readings are shown in the Table.

Control Example

A control sample was prepared in an identical manner to the inventive example except first deoxidizing before high temperature sintering.

TABLE

|  | As Manufactured | | After Life Test | | |
| --- | --- | --- | --- | --- | --- |
|  | CV/cc ($\mu$C/cc) | DCL/CV (na/$\mu$C) | CV/cc, $\mu$C/cc | DCL/CV, na/$\mu$C | Fail (%) |
| Control | 10,560 | 0.14 | 10,115 | 0.63 | 4.2 |
| Inventive | 11,352 | 0.10 | 11,011 | 0.12 | 0 |

In the Table, CV/cc is electric charge in microcoloumbs per cubic centimeter and DCL/CV is leakage current in nanoamps per microcoloumbs.

As realized from the results the inventive process provides a capacitor with about a 10% increase in volumetric efficiency (CV/cc) which is considered in the art to be a significant improvement. Of particular importance is the fact that the volumetric efficiency remains even after the capacitor is subjected to a 2000 hour Life test under extreme operation conditions. The inventive process also provides about 40% decrease in D.C. Leakage in as-manufactured parts in comparison to the conventional sintering as well as high stability of D.C. Leakage as evidenced by the Life test results. The control capacitor has a 450% increase in DCL/CV versus about 20% for the inventive sample. A low DCL/CV is critical for high voltage applications as is a high reliability as exhibited in the decrease in failures.

The present invention is particularly useful in the capacitor industry to supply robust components to the electronics industry. The invention has been described with reference to the preferred embodiments without limit thereto. Improvements and modifications which are within the scope of the invention as set forth in the claims appended hereto would be apparent to those with skill in the art after review of the instant disclosure.

The invention claimed is:

1. A process of manufacturing valve metal anodes comprising:
   providing a valve metal powder;
   pressing said valve metal powder to form a pellet;
   first deoxidizing said pellet with a first reducing agent to form a first oxide of reducing agent on said pellet;
   removing said first oxide of reducing agent from said pellet to form a deoxidized pellet;
   sintering said deoxidized pellet to form a sintered pellet;
   second deoxidizing said sintered pellet with a second reducing agent to form a second oxide of reducing agent on said sintered pellet; and
   removing said second oxide of reducing agent.

2. The process of manufacturing valve metal anodes of claim 1 wherein said sintering is in a vacuum or under inert gas.

3. The process of manufacturing valve metal anodes of claim 1 wherein valve-metal is selected from the group consisting of Ta and Nb.

4. The process of manufacturing valve metal anodes of claim 1 wherein said valve metal powder has a CV/g of at least 1,000 µC/g to no more than 50,000 µC/g.

5. The process of manufacturing valve metal anodes of claim 1 wherein said valve metal powder has a CV/g of at least preferably 1,500 µC/g-15,000 µC/g.

6. The process of manufacturing valve metal anodes of claim 1 wherein said reducing agent is selected from the group consisting of an alkali metal, an alkaline earth metal or aluminum.

7. The process of manufacturing valve metal anodes of claim 6 wherein said first reducing agent or said second reducing agent is selected from the group consisting of calcium, magnesium and aluminum.

8. The process of manufacturing valve metal anodes of claim 7 wherein said first reducing agent or said second reducing agent is Mg.

9. The process of manufacturing valve metal anodes of claim 1 wherein said deoxidizing said pellet is at a temperature of at least 700° C. to no more than 1100° C.

10. The process of manufacturing valve metal anodes of claim 1 wherein said sintering is at a temperature which is above a temperature of deoxidizing said pellet.

11. The process of manufacturing valve metal anodes of claim 1 wherein said sintering is at a temperature of 1200-2100° C.

12. The process of manufacturing valve metal anodes of claim 11 wherein said sintering is at a temperature of 1200-1800° C.

13. The process of manufacturing valve metal anodes of claim 1 wherein said removing said oxide of reducing agent from said pellet comprises leaching in an aqueous solution comprising sulfuric acid and hydrogen peroxide.

14. The process of manufacturing valve metal anodes of claim 1 further comprising attaching a lead wire to said pellet.

15. The process of manufacturing valve metal anodes of claim 14 wherein said attaching a lead wire comprising pressing said valve metal powder around said lead wire.

16. The process of manufacturing valve metal anodes of claim 14 wherein said attaching a lead wire comprising attaching said lead wire to said pellet.

17. The process of manufacturing valve metal anodes of claim 16 wherein said attaching said lead wire is after said sintering.

18. The process of manufacturing valve metal anodes of claim 1 wherein said first reducing agent and said second reducing agent are the same.

* * * * *